United States Patent Office 3,084,187
Patented Apr. 2, 1963

3,084,187
SUBSTITUTED AMINOALKANESULFONIC ACIDS
Van R. Gaertner, Dayton, Ohio, assignor to Monsanto Chemical Company, St. Louis, Mo., a corporation of Delaware
No Drawing. Filed Mar. 18, 1959, Ser. No. 800,074
8 Claims. (Cl. 260—513)

This invention relates to new derivatives of aminoalkanesulfonic acids, more particularly to new N-substituted aminoalkanesulfonic acids. It is an object of this invention to obtain new salts of the N-substituted aminoalkanesulfonic acids. Within the purview of my invention are compositions having high surface activity comprising the compounds of my present invention, namely the salts of the N-substituted aminoalkanesulfonic acids. Still another object of my invention is the novel process of preparation of these new N-substituted aminoalkanesulfonic acids and their various salts. It is yet another object of my invention to prepare new N-substituted aminoalkanesulfonates having high efficiency as lathering agents, wetting-out agents, and as detergents.

According to my invention, new compounds are prepared by the reaction of aminoalkane compounds of the general formula

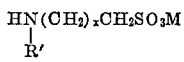

(where R' can be hydrogen, or a lower alkyl group of from 1 to 6 carbon atoms, $x$ is a small whole number from 1 to 5 inclusive, and M is hydrogen or a salt-forming group selected from the alkali metals and ammonia, the alkaline earth metals, or an aliphatic amine) with a compound having the formula $$R-Y-X-T'$$
$$\phantom{R-Y-X-}T$$

where R is a hydrocarbon chain having from 6 to 18 carbon atoms, Y can be methylene, oxygen, or sulfur and X is a trivalent paraffinic hydrocarbon radical of from 3 to 5 carbon atoms, T is halogen, T' is —OH, T and T' being respectively attached to the carbon atoms of X which are adjacent to each other, but which are not attached to Y. It is understood that if T and T' are taken together, a hydrogen halide is eliminated to give —O—, wherein the —O— atom is attached to adjacent carbon atoms. As reactants, in the preparation of the new compounds of my invention, I can use the haloalkanols of the general formula

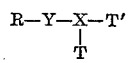

wherein R, Y, and X are as defined above and the halogen, which can be Cl, Br, or I, and the hydroxy radical are attached to carbon atoms of X which are adjacent to each other but which are not attached to Y. Presently useful compounds are also the compounds known as substituted epoxyalkanes having the general formula

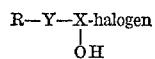

wherein R, Y and X are as defined above and the bivalent —O— atom is attached to carbon atoms of X which are adjacent to each other but which are not attached to Y.

Reaction of the aminoalkane compound with the haloalkanol compound or with the substituted epoxyalkane gives the presently-provided hydroxy-containing surface active agents, i.e., compounds of the general formula

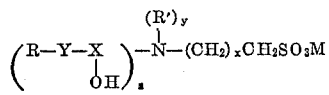

where R can be an aliphatic hydrocarbon radical having from about 6 to about 18 carbon atoms, Y is oxygen, sulfur, or a methylene group, X is a trivalent paraffinic hydrocarbon radical of from 3 to 5 carbon atoms having the hydroxyl group at the 2-position thereof with respect to the amino nitrogen atom, $z$ can be 1 or 2 and $y$ is 0 or 1, but the sum of $z$ and $y$ is 2, R' is hydrogen or an alkyl radical of from 1 to 6 carbon atoms, $x$ is an integer from 1 to 5, and M is hydrogen, an ammonium or alkali metal ion.

The reaction for the preparation of the new compound of my invention can be represented by the equation

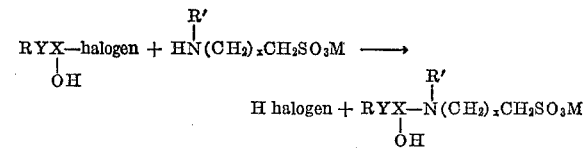

when R' is H, and excess of the haloalkanol compound is used, the reaction proceeds to give product having the formula

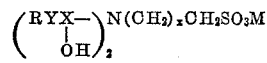

With the substituted epoxyalkane, an addition reaction is involved according to the equation

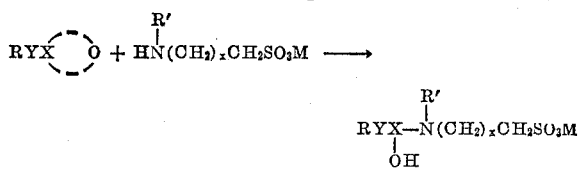

Aminoalkanesulfonates which can be used in the preparation of the new compounds of my invention include, e.g., sodium taurinate, potassium 3-aminopropanesulfonate, ammonium 4-aminobutanesulfonate, potassium 5-aminopentanesulfonate, sodium 6-aminohexanesulfonate, sodium N-methyltaurinate, sodium N-ethyltaurinate, sodium N-tert. butyl-4-aminobutanesulfonate, ammonium N-hexyltaurinate, sodium N - hexyl - 6 - aminohexanesulfonate, etc.

Representative chlorohydrins which can be used as intermediates in the preparation of the new compounds of my invention can be selected from the following:

alkyloxy-1-halo-2-alkanols
alkyloxy-2-halo-1-alkanols
alkylthio-1-halo-2-alkanols
alkylthio-2-halo-1-alkanols
cycloalkyloxy-1-halo-2-alkanols
cycloalkyloxy-2-halo-1-alkanols
cycloalkylthio-1-halo-2-alkanols
cycloalkylthio-2-halo-1-alkanols
alkenyloxy-1-halo-2-alkanols
alkenyloxy-2-halo-1-alkanols
alkenylthio-1-halo-2-alkanols
alkenylthio-2-halo-1-alkanols
cycloalkenyloxy-1-halo-2-alkanols
cycloalkenyloxy-2-halo-1-alkanols
cycloalkenylthio-1-halo-2-alkanols
cycloalkenylthio-2-halo-1-alkanols In all of the above, the alkyl, cycloalkyl, alkenyl, and cycloalkenyl radical has from 6 to about 18 or more carbon atoms; the halo substituent is either chlorine, bromine or iodine and the alkanol radical has from 3 to 5 carbon atoms. The presently useful alkyloxy- or alkylthio-substituted chlorohydrins can be chloropropanols of the structure (I) or (II):

(I) $\quad RXCH_2CHOHCH_2Cl$
(II) $\quad RXCH_2CHClCH_2OH$ or they can be the similarly substituted cholorobutanols of the structure (III) or (IV):

(III)    RXCH$_2$CH$_2$CHOHCH$_2$Cl
(IV)    RXCH$_2$CH$_2$CHClCH$_2$OH or they can be the similarly substituted chloropentanols of the structure (V) or (VI):

(V)    RX(CH$_2$)$_3$CHOHCH$_2$Cl
(VI)   RX(CH$_2$)$_3$CHClCH$_2$OH or they can be the similarly substituted 1-, 2-, or 3-methyl- or ethylpropanols of, say, the structure (VII), (VIII), (IX), (X) or (XI):

(VII)   RXCH$_2$CHOHCH(CH$_3$)Cl
(VIII)  RXCH$_2$C(CH$_3$)OHCH$_2$Cl
(IX)    RXCH(CH$_3$)CHClCH$_2$OH
(X)     RXCH(CH$_3$)CHOHCH$_2$Cl
(XI)    RXCH(C$_2$H$_5$)CHOHCH$_2$Cl or they can be the similarly substituted dimethylpropanols of, say, the structure (XII) or (XIII):

(XII)   RXC(CH$_3$)$_2$CHOHCH$_2$Cl
(XIII)  RXCH(CH$_3$)CHOHCH(CH$_3$)Cl or they can be the similarly substituted methylbutanols, of, say, the structure (XIV), (XV) or (XVI):

(XIV)   RXCH(CH$_3$)CH$_2$CHOHCH$_2$Cl
(XV)    RXCH$_2$CH$_2$C(CH$_3$)OHCH$_2$Cl
(XVI)   RXCH$_2$CH(CH$_3$)CHOHCH$_2$Cl

In all of the above compounds, R will be a hydrocarbon radical of from 6 to about 18 or more carbon atoms and X will be methylene, oxygen or sulfur. Thus, in the preparation of the presently provided surface active agents, there can be used as the alkoxychlorohydrin component such compounds as 3-n-dodecyloxy-1-chloro-2-propanol as illustrative of (I); 3-n-dodecyloxy-2-chloro-1-propanol as illustrative of (II); 4-n-dodecylthio-1-chloro-2-butanol as illustrative of (III); 4-(2-ethylhexyloxy)-2-chloro-1-butanol or 4-tetradecyloxy-2-chloro-1-butanol as illustrative of (IV); 5-(2-ethylhexylthio)-1-chloro-2-pentanol as illustrative of (V); 5-tridecyloxy-2-chloro-1-pentanol as illustrative of (VI); 1-tert-dodecylthio - 3 - chloro - 2 - butanol as illustrative of (VII); 3-octadecenyloxy-1-chloro-2-methyl-2-propanol as illustrative of (VIII); 3-(4 - n - octylcyclohexenyloxy)-2-chloro-1-butanol or 3-(7-ethyl-2-methyl-4-undecyloxy)-2-chloro-1-butanol as illustrative of (IX); 3-dodecyloxy-1-chloro-2-butanol as illustrative of (X); 3-isododecyloxy-1-chloro-2-pentanol as illustrative of (XI); 3-isononyloxy-1-chloro-3-methyl-2-butanol as illustrative of (XII); 2-n-dodecyloxy-4-chloro-3-pentanol or 2-isotridecylthio-4-chloro-3-pentanol as illustrative of (XIII); 4-n-octadecylthio-1-chloro-2-hydroxypentanol as illustrative of (XIV); and 4-isooctyloxy-1-chloro-2-methyl-2-butanol as illustrative of (XV); and 4-(n-hexadecyloxy)-1-chloro-2-butanol as illustrative of (XVI).

An especially valuable class of chlorohydrins which are useful for the preparation of the presently provided new compounds of my invention includes the 1-alkoxy-3-chloro-2-propanols, i.e., compounds of the structure ROCH$_2$CH—CH$_2$
        |      |
        OH    Cl wherein R denotes a branched alkyl radical of from 6 to 18 carbon atoms. Examples thereof are 1-tert-octyloxy-3-chloro-2-propanol; 1-(2 - ethylhexyloxy)-3-chloro-2-propanol; 1-isononyloxy-3-chloro-2-propanol; branched-chain 1-nonyloxy-3-chloro-2-propanol wherein the nonyl radical is derived from the branched-chain nonanol prepared according to the "Oxo" process from carbon monoxide, hydrogen and diisobutylene; branched-chain 1-decyloxy-3-chloro-2-propanol wherein the decyl radical is derived from branched-chain "Oxo" process decanol prepared from carbon monoxide, hydrogen and propylene trimer; 1-(2 - propylheptyloxy) - 3 - chloro-2-propanol; 1-(5-ethylnonyloxy)-3-chloro-2-propanol; 1-(2,6,8-trimethylnonyloxy)-3-chloro-2-propanol; 1-(2-butyloctyloxy)-3-chloro-2-propanol; 1-tert-dodecyloxy-3-chloro-2-propanol; branched-chain 1-tridecyloxy-3-chloro-2-propanol wherein the tridecyl radical is derived from the branched-chain tridecanol prepared according to the "Oxo" process by the high temperature, high pressure reaction of carbon monoxide and hydrogen with a C$_{12}$ olefin polymer such as triisobutylene or tetrapropylene; 1-(7-ethyl-2-methyl-4-undecyloxy) - 3 - chloro-2-propanol; branched-chain 1-hexadecyloxy-3-chloro-2-propanol wherein the hexadecyl radical is derived from a branched-chain "Oxo" process hexadecanol obtained by the reaction of carbon monoxide and hydrogen with propylene pentamer, and 1-tert-octadecyloxy-3-chloro-2-propanol.

As hereinbefore stated, the presently provided reaction products of aminoalkane compounds with substituted haloalkanols or with substituted epoxyalkanes are likewise obtainable from alkyloxy-, alkylthio-, or unsubstituted epoxyalkanes, i.e., compounds of the formula

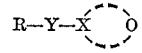

in which R is a hydrocarbon radical of from 6 to 18 carbon atoms, Y is selected from the class consisting of methylene, oxygen, and sulfur and X is a trivalent paraffinic hydrocarbon atom and in which the bivalent —O— atom is attached to carbon atoms of X which are adjacent to each other but which are not attached to Y. The epoxyalkanes are readily available by dehydrohalogenation of the corresponding alkyloxy- or alkylthio-substituted halohydrins or from the epoxidation of 1-olefins.

For preparing the compounds of my invention I can use epoxy compounds of the following classes (where R is an alkyl group of 6 to about 18 carbon atoms, and Y is sulfur, oxygen, or a methylene radical):

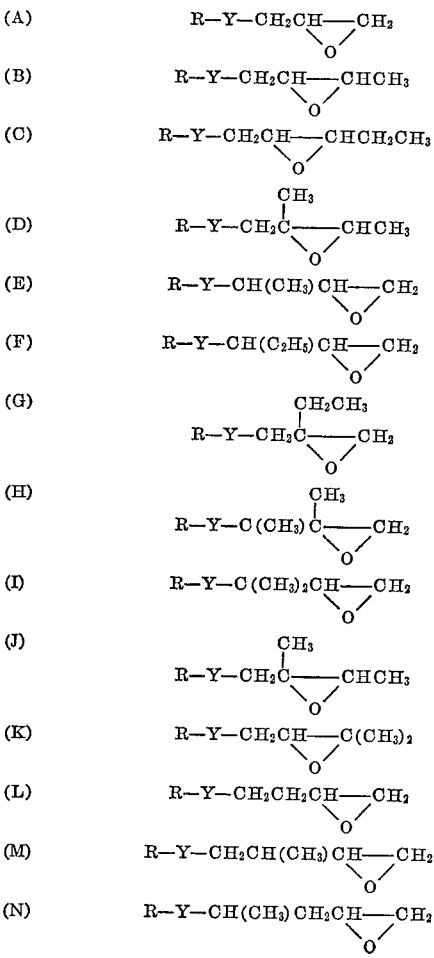

(O)              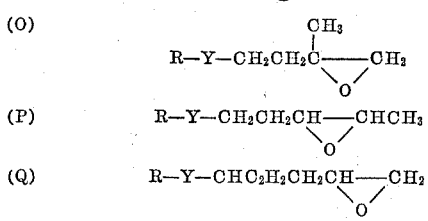

(P)    R—Y—CH₂CH₂CH——CHCH₃
                      \O/

(Q)    R—Y—CHC₂H₂CH₂CH——CH₂
                         \O/

Examples of compounds having the above structures are for (A) the glycidyl ethers such as 2-ethylhexyl glycidyl ether or the corresponding thio ether such as 1-isodecylthio-2,3-epoxypropane; for (B) 1-(tert-dodecyloxy-2,3-epoxybutane; for (C) 1-(n-dodecyl)2,3-epoxypentane; for (D) 1 - isotridecyloxythio-2-methyl-2,3-epoxybutane; for (E) 2-isononyloxy-3,4-epoxybutane; for (F) 3-dodecenyloxy-3,4-epoxybutane; for (G) 1-(4-n-hexylcyclohexyloxy)-2-ethyl-2,3-epoxypropane; for (H) 2-dodecylthio-3-methyl-3,4-epoxybutane; for (I) 2-(4-octadecyloxy)-3-methyl-3,4-epoxybutane; for (J) 1-hexadecylthio-2-methyl-2,3-epoxybutane; for (K) 1-(n-octyl) - 3 - methyl-2,3-epoxypentane; for (L) 1-(4-n-octylcyclohexenyloxy)-3,4-epoxybutane; for (M) 1-(isodecoxy)-2-methyl-3,4-epoxybutane; for (N) 2-n-dodecylthio-4,5-epoxypentane; for (O) 1-(n-hexyloxy)-3-methyl-3,4-epoxybutane; for (P) 1-isotridecylthio-3,4-epoxypentane; for (Q) 1-isononyloxy-4,5-epoxypentane etc.

An important class of presently useful epoxy compounds are glycidyl ethers or thio ethers having either straight-chain or branched-chain higher alkyl substituents. These glycidyl ethers can be otained by dehydrohalogenation of an appropriate 1-alkoxy-3-chloro-2-propanol. Examples of alkyl glycidyl ethers which are useful for the preparation of the new compounds according to my invention are n-octyl, n-nonyl, n-decyl, n-undecyl, n-dodecyl, n-pentadecyl, n-octadecyl glycidyl ethers and branched-chain nonyl, decyl, tridecyl, hexadecyl and octadecyl glycidyl ethers wherein the branched-chain alkyl radicals are derived from either "Oxo" process nonanol, "Oxo" process decanol, the "Oxo" process tri-decanol, "Oxo" process hexadecanol or branched-chain octadecanol; and such other branched-chain alkyl glycidyl ethers as 2-ethylhexyl glycidyl ether, tert-octyl glycidyl ether, 2-propylheptyl glycidyl ether, 5-ethylnonyl glycidyl ether, 2,6,8-trimethylnonyl glycidyl ether, 2-butyloctyl glycidyl ether, tert-dodecyl glycidyl either, tert-pentadecyl glycidyl ether, tert-heptadecyl glycidyl ether and tert-octadecyl glycidyl ether.

Instead of employing the 1-alkoxy-3-chloro-2-propanols for preparing the alkyl glycidyl ethers I can use the 3-alkoxy-2-chloro-1-propanols, whereby the dehydrohalogenation process likewise effects ring closure to the epoxy group, thus

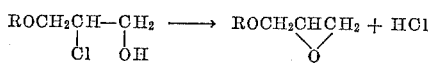

wherein R is an alkyl radical of from 6 to 18 carbon atoms. Thus, from 3-n-octyloxy-2-chloro-1-propanol there is obtained n-octyl glycidyl ether; from 3-(2-ethylhexyloxy)-2-chloro-1-propanol there is obtained 2-ethylhexyl glycidyl ether; from branched-chain 3-nonyloxy-2-chloro-1-propanol wherein the branched-chain nonyl radical is derived from "Oxo" process nonanol there is obtained the correspondingly branched nonyl glycidyl ether; from 3-(2-ethylheptyloxy)-2-chloro-1-propanol there is obtained 2-ethylheptyl glycidyl ether; from 3-n-decyloxy-2-chloro-1-propanol there is obtained n-decyl glycidyl ether; from 3-n-dodecyloxy-2-chloro-1-propanol there is obtained n-dodecyl glycidyl ether; from 3-(2-butyloctyloxy)-2-chloro-1-propanol there is obtained 2-butyloctyl glycidyl ether; from branched-chain 3-tridecyloxy-2-chloro-1-propanol wherein the tridecyl radical is derived from the "Oxo" process tridecanol described herein above there is obtained the correspondingly branched tridecyl glycidyl ether; from 3-(7-ethyl-2-methyl-4-undecyloxy)-2-chloro-1-propanol there is obtained the 7-ethyl-2-methyl 4-undecyl glycidyl ether; from 3-n-hexadecyloxy-2-chloro-1-propanol there is obtained n-hexadecyl glycidyl ether; and from 3-n-octadecyloxy-2-chloro-1-propanol there is obtained n-octadecyl glycidyl ether.

The N-substituted aminoalkanesulfonates of my present invention have exceptional surface active properties, particularly in the general fields of detergents, wetting agents and lathering agents. While I do not wish to be bound to any specific theory as to the reasons for the excellent surface activity of the compounds of my invention, I have demonstrated that a long aliphatic hydrocarbon chain is required as the hydrophobic portion of the molecule. If the aliphatic hydrocarbon chain is replaced with a group containing an aromatic ring within the hydrophobic "tail" of the molecule, the product has poor surface activity.

Highly useful compounds can be prepared, as a further embodiment of my invention, by the reaction of an aminoalkanesulfonate with a higher alkyl glycidyl thio ether. Instead of employing alkoxy substituted chloropropanols as in the production of the glycidyl oxygen ethers there are used the higher alkylthiochloropropanols, which yield the alkyl glycidyl thioether in the following manner:

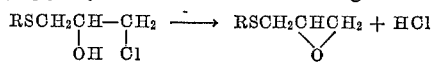

and/or

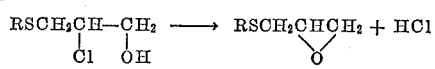

wherein R is an alkyl radical of form 6 to 18 carbon atoms. For example, very valuable for the present purpose is the n-octyl glycidyl thio ether which is obtained either 1-n-octylthio-3-chloro-2-propanol or 3-n-octylthio-2-chloro-1-propanol or a mixture of the same; tert-dodecyl glycidyl thio ether from either 1-tert-dodecylthio-3-chloro-2-propanol or 3-tert-dodecylthio-2-chloro-1-propanol or a mixture thereof; n-hexadecyl glycidyl thio ether from either 1-n-hexadecylthio-3-chloro-2-propanol or 3-n-hexadecylthio-2-chloro-1-propanol; n-octadecyl glycidyl thio ether from either 1-n-octadecylthio-3-chloro-2-propanol or 3-n-octadecylthio-2-chloro-1-propanol etc.

The substituted halohydrins which are advantageously employed for the preparation of either the new compounds of my invention directly, or for glycidyl ethers of use in preparing these compounds, are obtainable by the reaction of a suitable 6 to 18 carbon alkanol with an epihalohydrin. There is thus obtained an isomeric mixture of alkoxyhaloalkanols. Thus, the reaction of a suitable higher branched-chain alkanol with epichlorohydrin gives a predominant amount of the correspondingly branched-chain 1-alkoxy-3-chloro-2-propanol together with a minor amount of the correspondingly branched-chain 3-alkoxy-2-chloro-1-propanol. Since either of these isomeric alkoxychloropropanols is converted to the same alkyl glycidyl ether, the mixture of isomeric chlorohydrins obtained from the alkanol and epichlorohydrins is conveniently used either for the formation of the alkyl glycidyl ether intermediate or directly with the aminoalkanesulfonate to give the new surface active materials.

Reaction of the aminoalkanesulfonate with either the alkyloxyhalohydrin or the substituted alkylepoxyalkane takes place readily by contacting the amino compound with the halohydrin or the epoxyalkane in a neutral or alkaline solution, advantageously in the presence of a basic catalyst and an inert diluent and allowing the resulting reaction mixture to stand until the desired product has been formed. Optimum yields are obtained by operating at moderately increased temperatures, say, at temperatures of from 80° C. to 100° C. However, external heating need not be employed. Presently useful basic catalysts include inorganic and organic alkaline materials such as the alkali metal hydroxide and basically reacting salts thereof, e.g., sodium hydroxide, potassium hydroxide, lithium hydroxide, sodium acetate, etc., or organic bases such as trimethylbenzylammonium hydroxide. As diluents there may be employed, e.g., aqueous solutions of lower aliphatic alcohols, aliphatic and aromatic hydrocarbons such as toluene or hexane, ethers such as isopropyl ether or dioxane and other inert organic liquids such as dimethylformamide and dimethylsulfoxide. When the desired products are prepared from the halohydrin, the reaction takes place with formation of hydrogen halide as by-product. Reaction is thus advantageously effected in the presence of a hydrogen halide scavenger, e.g., additional quantities of the base. The by-product hydrogen halide is thereby converted to an alkali metal salt which is readily separated from the desired surfactant product by taking advantage of solubility differences. The presently provided surface active agents are generally soluble in the lower alcohols and in some instances also soluble in ether and acetone.

The epoxyalkane reaction with aminoalkyl compounds takes place by addition of one component to another so there is no formation of by-product. When the reactants are used in substantially equimolar proportion and reaction is effected in the absence of a diluent, the reaction product generally may be used directly for a variety of industrial purposes. When the reaction is effected in the presence of a diluent, the reaction product comprises a solution of the surface active agent in the diluent. The diluent, as well as any unreacted epoxyalkane, is separated from the reaction mixture by customary isolation procedures, e.g., by distillation, solvent extraction, etc. Advantageously, removal of any excess of epoxyalkane is effected by solvent extraction, and the diluent then removed by volatilization. The residue thus consists of the substantially pure reaction product which can be completely dried, e.g., by spraying, to give powdered products or by vacuum-drying to give waxy to crystalline solids or viscous liquids depending upon the nature of the individual product.

The present compounds of my invention are stable, usually water soluble, friable solids or viscous liquids. They are advantageously employed for a variety of industrial and agricultural purposes and are particularly valuable as surfactants. Some of these compounds possess biological toxicant properties and others, particularly those which are viscous liquids at ordinary room temperatures, are valuable as plasticizing resins for synthetic resins and plastics and as textile adjuvants, e.g., as softening and antistatic agents.

In the preparation of many types of surface active agents the chain length, and degree of branching within the carbon chain, of the hydrophobic portion of the molecule is extremely critical. Within the scope of my invention I have chosen an aliphatic hydrocarbon chain to constitute the hydrophobic portion of the molecule. As illustrated by Examples 7 through 12 below the surface activity of compounds containing an aromatic ring in the molecule is surprisingly inferior to the high surface activity of the compounds of my invention, and I find that aromatic rings can not be tolerated for this reason.

In order to illustrate some of the various aspects of the invention and to serve as a guide in applying the invention the following specific examples are given. It will, of course, be understood that variations from the particular temperatures, diluents or solvents, proportions, etc. can be made without departing from the invention.

*Example 1*

A mixture of saturated fatty alcohols having an average molecular weight of about 258, corresponding to a mixture of $C_{16}$ and $C_{18}$ saturated fatty alcohols, marketed by Archer-Daniels-Midland Company as Adol 65, was used to prepare a representative alkoxychloroalkanol. Into a 1 liter reactor was charged 258 g., 1.0 mole of Adol 65 and 95 g., 1.0 mole of epichlorohydrin. The mixture was warmed to 40° and 1.0 ml. of boron trifluoride-etherate complex was added. The mixture was stirred and heated gently until the reaction became exothermic (temperature about 75°), and the temperature was controlled at 100 to 110° by external cooling until the initial reaction had subsided. The reaction mixture was maintained at 100° for an additional one hour period. Catalyst, after absorption on activated alumina, was filtered off and the product distilled. The fraction boiling from 173° at 0.4 mm. to 206° at 0.2 mm. was collected as product (Adol 65 chloropropanol) having the formula

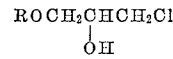

where R is essentially a mixture of n-$C_{16}H_{33}$— and n-$C_{18}H_{37}$—.

Adol 65 chloropropanol, 202 g., 0.575 mole, and 0.8 mole of 40% aqueous sodium hydroxide were stirred with good mixing at 95 to 100° C. in the presence of 100 ml. of dioxane for 18 hours. After cooling, the mixture was filtered and the aqueous layer which separated was discarded. The organic layer was dried over anhydrous sodium sulfate and distilled. A fraction boiling at 156° to 179° at 0.2 mm. was collected as Adol 65 glycidyl ether having the general formula

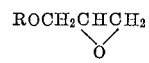

wherein R is as defined above, namely essentially a mixture of n-$C_{16}H_{33}$— and n-$C_{18}H_{37}$— alkyl radicals.

*Example 2*

A mixture of 31.5 g., 0.10 mole Adol 65 glycidyl ether prepared according to the procedure of Example 1, 51 g. of 35% aqueous sodium N-methyltaurinate, 0.11 mole, and 50 ml. ethanol were heated with mixing, at 80° for 15 minutes. Excess isopropanol was added to precipitate the inorganic salt which was filtered off. The solution was dried by distilling off the alcohol-water azeotrope under reduced pressure, and the product crystallized from the cooled isopropanol solution. The product from this reaction, sodium N-(3-n-alkoxy-2-hydroxy-1-propyl)-N-methyltaurinate, was found to be highly active as a detergent. Alkoxy in the product name is understood to be the normal alkyl radicals derived from Adol 65 and has the formula of a mixture of n-$C_{16}H_{33}$— and n-$C_{18}H_{37}$— radicals.

*Example 3*

A solution of 51 g., 0.11 mole of 35% aqueous sodium N-methyltaurinate, 50 ml. ethanol and 18.4 g., 0.10 mole, 1,2-epoxydodecane were heated to 80° C. for 30 minutes, then cooled to 25° and neutralized with hydrochloric acid. The solution was diluted with excess isopropanol, filtered, and isopropanol was stripped off under reduced pressure. The resulting product, the sodium salt of N-(2-hydroxy-1-dodecyl)-N-methyltaurine was found to be highly surface active.

*Example 4*

The starting material in this example, tridecoxychloropropanol was prepared according to the procedure of Example 1, by the reaction of epichlorohydrin and "Oxo" process tridecyl alcohol. A mixture of 29.8 g., 0.1 mole, tridecoxychloropropanol, 15.3 g., 0.11 mole, 3-aminopropanesulfonic acid, 100 ml. of 1:1 water-ethanol and 7 ml. of 40% sodium hydroxide were heated to reflux (80°). After 2 hours an addition of 1.5 g. aminopropanesulfonic acid and 3.0 ml. sodium hydroxide was made and refluxing continued for an additional 30 minutes. Excess isopropanol was added to precipitate inorganic salts which were filtered off. Solvents were evaporated under reduced pressure and the product was dried in a vacuum oven at 45°. This material was found by analysis to be the di-substituted aminopropanesulfonate. The formula of the product may be written

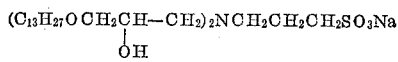

*Analysis.*—Percent sulfur, calculated for $$C_{35}H_{72}NNaO_7S$$

4.76%; found 4.23%.

Example 5

To a refluxing solution of 50 ml. ethanol and 184 g. of 35% aqueous solution of sodium N-methyltaurinate was added at a dropwise rate 59.6 g. of tridecoxychloropropanol. Thymolphthalein blue was added to the reactor to serve as an indicator as the pH during the reaction period was maintained at a level just above 9.0 by the intermittent addition of aqueous sodium hydroxide. Excess isopropanol was added to precipitate the inorganic salt which was then removed by filtration. The solvent was evaporated under reduced pressure to recover the product, sodium N-methyl-N-(3-tridecyloxy-2-hydroxy-1-propyl)taurine. This product had excellent surface active properties.

Example 6

To 100 ml. of 50% aqueous ethanol was added 41.3 g., 0.185 mole, 1-chloro-3-(2-ethylhexyloxy)propanol-2 and 15.3 g., 0.11 mole, 3-aminopropanesulfonic acid. The pH of the solution was adjusted to 8 with aqueous sodium hydroxide and the solution was heated to reflux (80 to 85°) with efficient mixing. The solution was maintained at pH of at least 8.0 by the dropwise addition of aqueous sodium hydroxide as the reaction proceeded. After one hour at reflux the reaction was essentially complete. Excess isopropanol was added to precipitate the inorganic salts which were filtered off. The product was isolated by evaporation of the solvents at reduced pressure to recover, in essentially quantitative yield, the white hard product, sodium N,N - bis[3-(2-ethylhexyl) - 2-hydroxy-1-propyl]-3-aminopropanesulfonate. This product had exceptional properties as a wetting and lathering agent.

Example 7

To a mixture of 220.3 g., 1.0 mole nonylphenol, and 92.5 g., 1.0 mole, epichlorohydrin was added 1.0 ml. BF₃-etherate complex. The reaction proceeded rapidly and exothermically. After the reaction was completed, as evidenced by a drop in temperature, activated alumina powder was added to absorb $BF_3$. The product was filtered and distilled and the fraction boiling at 162 to 198° at 0.7 to 1.2 mm. was collected, refractive index was $n_D^{25}$ 1.5094, as nonylphenoxychloropropanol.

A mixture of 21.9 g., 0.070 mole of this nonylphenoxychloropropanol, 35 g. of 35% aqueous sodium N-methyltaurinate solution, 0.075 mole, and 50 ml. ethanol were heated with stirring for 50 minutes at reflux. During the refluxing period aqueous sodium hydroxide was added as needed to maintain the pH above 9.0. The cooled solution was extracted with hexane to remove traces of insoluble oils. The pH was adjusted to 7.5 with dilute HCl and isopropanol was added to precipitate the inorganic salts which were filtered from the solution. The solvents were evaporated at reduced pressure to recover the gummy product, sodium N-methyl-N-(3-nonylphenoxy-2-hydroxy-1-propyl)taurinate.

Example 8

An intermediate dodecylphenacyl chloride was prepared from the aluminum chloride-catalyzed reaction of chloroacetyl chloride with dodecylbenzene. The procedure of Chaiken and Brown, Journal of the American Chemical Society, 71, page 122 (1949), was used to reduce the dodecylphenacyl chloride to dodecylphenylethylene chlorohydrin. The reduction was carried out by the use of sodium borohydride at a temperature below 20° C. The desired chlorohydrin had a boiling point of 152 to 159° C. at 0.2 mm. and a refractive index $n_D^{25}$ 1.5098.

A mixture of 17.0 g. dodecylphenylethylene chlorohydrin, 25 ml. aqueous 35% N-methyltaurine solution, 50 ml. ethanol, and 10 ml. of water were heated at 80° C. for one hour. An addition of 4 ml. N-methyltaurine solution was made, and heating was continued for an additional 30 minutes at 80° C. The cooled solution was extracted with hexane to remove traces of oils, and then excess isopropanol added to precipitate the inorganic salts which were filtered off. The solid product, sodium N-(2-dodecylphenyl-2-hydroxyethyl)-N-methyltaurine was recovered by evaporation of the solvent under reduced pressure.

Example 9

To illustrate the superiority of the products of my invention as surface active agents the detergency properties of the product of Example 2 were compared to the detergency properties of the product of Example 7. Detergency efficiency was measured by employing the method described by J. C. Harris and E. L. Brown in the Journal of the American Oil Chemists' Society, 27, 135–143 (1950). In this method the detergency of materials is compared with the detergency of Gardinol WA, a commercial detergent produced by sulfating the mixture of alcohols, principally $C_{12}$, obtained by hydrogenating coconut oil fatty acids. The following detersive efficiencies were measured:

|  | 50 p.p.m. water hardness | 300 p.p.m. water hardness |
| --- | --- | --- |
| Product of Ex. 2 | 91 | 93 |
| Product of Ex. 7 | 68 | 54 |

Example 10

Using the detergency evaluation procedure of Example 9, detergency was compared using "built" materials. The products were formulated by using 15% of the "active" surfactant with the balance of the formulation being composed of sodium tripolyphosphate, sodium tetrapyrophosphate, sodium silicate and soda ash. The following results were obtained:

|  | 50 p.p.m. water hardness | 300 p.p.m. water hardness |
| --- | --- | --- |
| Product of Ex. 2 | 108 | 132 |
| Product of Ex. 3 | 91 | 102 |
| Product of Ex. 4 | 90 | 104 |
| Product of Ex. 8 | 77 | 73 |

Example 11

The superiority of the compounds of my invention as wetting agents was shown when these products were evaluated for wetting efficiency as determined by the Draves Wetting Test of the American Association of Textile Chemists. The following wetting times in seconds were measured at concentrations of 0.125% and 0.0625%:

|  | 0.125% conc. | 0.0625% conc. |
| --- | --- | --- |
| Product of Example 3 | 13.0 | 50 |
| Product of Example 5 | 18.1 | 38.0 |
| Product of Example 6 | 3.1 | 7.0 |
| Product of Example 7 | 33.3 | 112 |
| Product of Example 8 | 125 | 180+ |

Example 12

Products of my invention can find wide applications where a high level of foaming or sudsing activity is demanded, e.g., shampoos, liquid dishwashing compositions, shaving creams, etc. The Ross-Miles Lather Test of the American Society for Testing Materials was used to evaluate the lathering activity of these compounds. The following results were obtained:

LATHER HEIGHT MEASURED IN CENTIMETERS, IN WATER OF 300 P.P.M. HARDNESS

|  | At once/5 min. |
|---|---|
| Product of Example 3 | 20.6/20.6 |
| Product of Example 5 | 20.2/20.0 |
| Product of Example 6 | 18.0/16.6 |
| Product of Example 7 | 10.3/9.8 |
| Product of Example 8 | 4.3/2.7 |

While the invention has been described with particular reference to preferred embodiment thereof, it will be appreciated that variations from the details given herein can be effected without departing from the invention in its broadest aspects.

I claim:

1. A N-substituted aminoalkanesulfonate of the formula

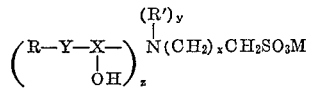

in which R is an aliphatic saturated hydrocarbon radical having from 6 to 18 carbon atoms, Y is selected from the class consisting of methylene and oxygen, X is a trivalent paraffinic hydrocarbon radical of from 3 to 5 carbon atoms having the —OH at the 2-position thereof with respect to the amino nitrogen atom, z is an integer from 1 to 2, y is an integer from 0 to 1, and the sum of y+z=2, R' is selected from the group consisting of hydrogen and alkyl radicals of 1 to 6 carbon atoms, x is an integer from 1 to 5, and M is selected from the group consisting of hydrogen, ammonium, and alkali metal ions.

2. A sodium N-(3-n-alkoxy-2-hydroxy-1-propyl)-N-methyltaurine wherein the alkoxy radical has from 6 to 18 carbon atoms.

3. An alkali metal salt of N-(2-hydroxy-1-alkyl)-N-methyltaurine wherein alkyl is an aliphatic hydrocarbon radical of from 6 to 18 carbon atoms.

4. Sodium N-(3-n-hexadecyloxy-2-hydroxy-1-propyl)-N-methyltaurine.

5. Sodium N-(2-hydroxy-3-n-octadecyloxy-1-propyl)-N-methyltaurine.

6. Sodium M-(3-tridecyloxy-2-hydroxy-1-propyl)-N-methyltaurine wherein the tridecyloxy radical is derived by the "Oxo" process from $C_{12}$ olefin.

7. Sodium N,N-bis[3-(2-ethylhexyloxy)-2-hydroxy-1-propyl]-3-aminopropanesulfonate.

8. Sodium N-2-hydroxy-1-dodecyl)-N-methyltaurine.

References Cited in the file of this patent

UNITED STATES PATENTS

| 2,721,875 | Dickert et al. | Oct. 25, 1955 |
| 2,817,675 | Hofer et al. | Dec. 24, 1957 |
| 2,830,082 | Sexton et al. | Apr. 8, 1958 |

OTHER REFERENCES

Finar: "Organic Chemistry," 3rd edition, vol. 1, page 317 (1959), (copy in Pat. Off. Sci. Library).